United States Patent [19]

Romano

[11] Patent Number: 5,081,883
[45] Date of Patent: Jan. 21, 1992

[54] DEVICE FOR ATTACHING A SHOE TO A BICYCLE PEDAL

[75] Inventor: Antonio Romano, Padova, Italy

[73] Assignee: Campagnolo S.r.l., Vincenza, Italy

[21] Appl. No.: 505,965

[22] Filed: Apr. 6, 1990

[30] Foreign Application Priority Data

Apr. 13, 1989 [IT] Italy ............................... 67273 A/89

[51] Int. Cl.⁵ ............................................. G05G 1/14
[52] U.S. Cl. ................................. 74/594.6; 74/594.4; 36/131
[58] Field of Search ................ 74/594.4, 594.6; 36/131, 132

[56] References Cited

U.S. PATENT DOCUMENTS

| | | | |
|---|---|---|---|
| 4,640,151 | 2/1987 | Howell | 36/131 X |
| 4,686,867 | 8/1987 | Bernard et al. | 36/131 X |
| 4,815,333 | 3/1989 | Sampson | 36/131 X |
| 4,890,507 | 1/1990 | Farris et al. | 74/594.6 |
| 4,899,618 | 2/1990 | Christol | 74/594.6 |
| 4,942,778 | 7/1990 | Bryne | 74/594.4 X |

FOREIGN PATENT DOCUMENTS

2209717  5/1989  United Kingdom ............... 74/594.6

*Primary Examiner*—Vinh T. Luong
*Attorney, Agent, or Firm*—John R. Pegan

[57] ABSTRACT

A device for attaching a shoe to a bicycle pedal, comprising a pedal body and a counter-member fixed to the sole of the shoe and adapted to be fitted to the body of the pedal. Attachement is achieved by means of a tooth which is carried by the counter-member and engages a recess formed in the body of the pedal so as to prevent the backwards displacement of the counter-member relative to the body of the pedal. A step carried by the counter-member cooperates in the body of the pedal and prevents the upward detachment of the counter-member.

16 Claims, 6 Drawing Sheets

DEVICE FOR ATTACHING A SHOE TO A BICYCLE PEDAL

SUMMARY OF THE INVENTION

The present invention relates to a device for attaching a shoe to a bicycle pedal.

More particularly, the invention relates to a device of the type comprising:

a pedal body with an upper bearing surface, a counter-member which is fixed to the sole of the shoe and can be fitted on to the upper bearing surface of the pedal body, rapid-attachment means for establishing firm mutual engagement of the pedal body with the counter-member, the pedal body including a toe piece adapted to house a front portion of the counter-member when the pedal body and the counter-member are in the mutually coupled condition so as to prevent the upward detachment of the front portion of the counter-member from the upper bearing surface of the pedal body.

The object of the invention is to provide a device of the type defined above which has a simple, light structure and which enables the shoe to be locked on to to and to be released from the pedal quickly and easily.

According to the present invention, this object is achieved by the provision of an attachment device of the type specified above, characterised in that:

a) the counter-member has a step which is fixed to the member and is adapted to engage beneath a corresponding fixed step in the pedal body, the step being formed in a region of the pedal body which is spaced rearwardly of the toe piece so as completely to prevent the upward detachment of the counter-member from the upper bearing surface of the pedal body in the mutually coupled condition;

b) the rapid-attachment means comprise:

mutual coupling surfaces formed in the counter-member and in the pedal body respectively and extending essentially in planes parallel to the length of the counter-member and of the pedal body, one of the surfaces having a recess and the other a tooth which can engage in the recess in the coupled condition as a result of a movement of the counter-member relative to the pedal in a direction transverse its length, a thrust member which is urged y a spring and is carried by the pedal body or by the counter-member —in the coupled condition —to exert a transverse force on the other member so as to prevent the recess and the tooth from moving apart when they are subjected to a force below a predetermined value which tends to move them apart; the member which is not provided with the thrust member having a cam surface for cooperating with the thrust member when the counter-member is fitted on to the upper surface of the pedal body so as first to cause the retraction of the thrust member and then to snap engage the tooth in the recess under the force returning the thrust member to its projecting position.

The device according to the invention ensures that the shoe is fixed to the pedal whatever movement occurs during pedalling. Release is achieved by a simple transverse rotary movement of the heel of the shoe away from the bicycle.

Further characteristics and advantages of the present invention will become clear from the detailed description which follows with reference to the appended drawings, provided by way of non-limiting example, in which:

DETAILED DESCRIPTION OF THE PREFERRED EMBODIMENTS

With reference to the drawings, a left-hand bicycle pedal is indicated 1 and has a body 2 which is rotatably mounted, in known manner, on a pin 3 with a threaded end 4 for connection to the respective pedal crank (not shown).

In the present description and in the following claims, geometric references are intended to relate to the normal operating position of the pedal mounted on the bicycle.

The pedal body 2 has a flat upper surface 5 on which the flat undersurface 6 of a counter-member 7 bears, in use. The counter-member 7 has three slots 8 for its fixing to the sole of a shoe 9 which can be seen in FIGS. 2 and 3. The counter-member 7 is fixed to the sole of the shoe 9 by means of screws 10 which pass through the slots 8 with the interposition of washers 11.

The counter-member 7 has a rounded front portion 12 which, in known manner, engages a toe piece 13 formed in the front part of the pedal body 2.

An anchoring block 15 is fixed to the lower surface 6 of the counter-member 7 by means of a screw 14.

Alternatively, the block 15 could be formed integrally with the counter-member 7.

The block 15 is inserted in a seat 16 formed in the rear of the pedal body 2 and, in the manner which will better be explained below, establishes the engagement of the counter-member 7 with the pedal body 2.

A tooth 18 is formed on one side 17 of the block 15 and has a stop surface 19 which extends perpendicular to the surface 6 of the counter-member 7. In its wall 20 which faces the side 17 of the block 15, the seat 16 of the pedal body 2 has a recess 21 which extends perpendicular to the surface 5 of the pedal body 2 and has a shape corresponding to that of the tooth 18. The stop surface 19 of the tooth 18 and the corresponding surface 22 of the recess 21 are inclined towards the rear of the pedal body 2 (see FIGS. 4 and 5) and constitute a restraint against the release of the block 15 towards the rear of the pedal. The wall 20, at the opening into the seat 16, has a connecting part 23 with a large radius of curvature which facilitates the insertion of the block 15 into the seat 16.

Figure 1:
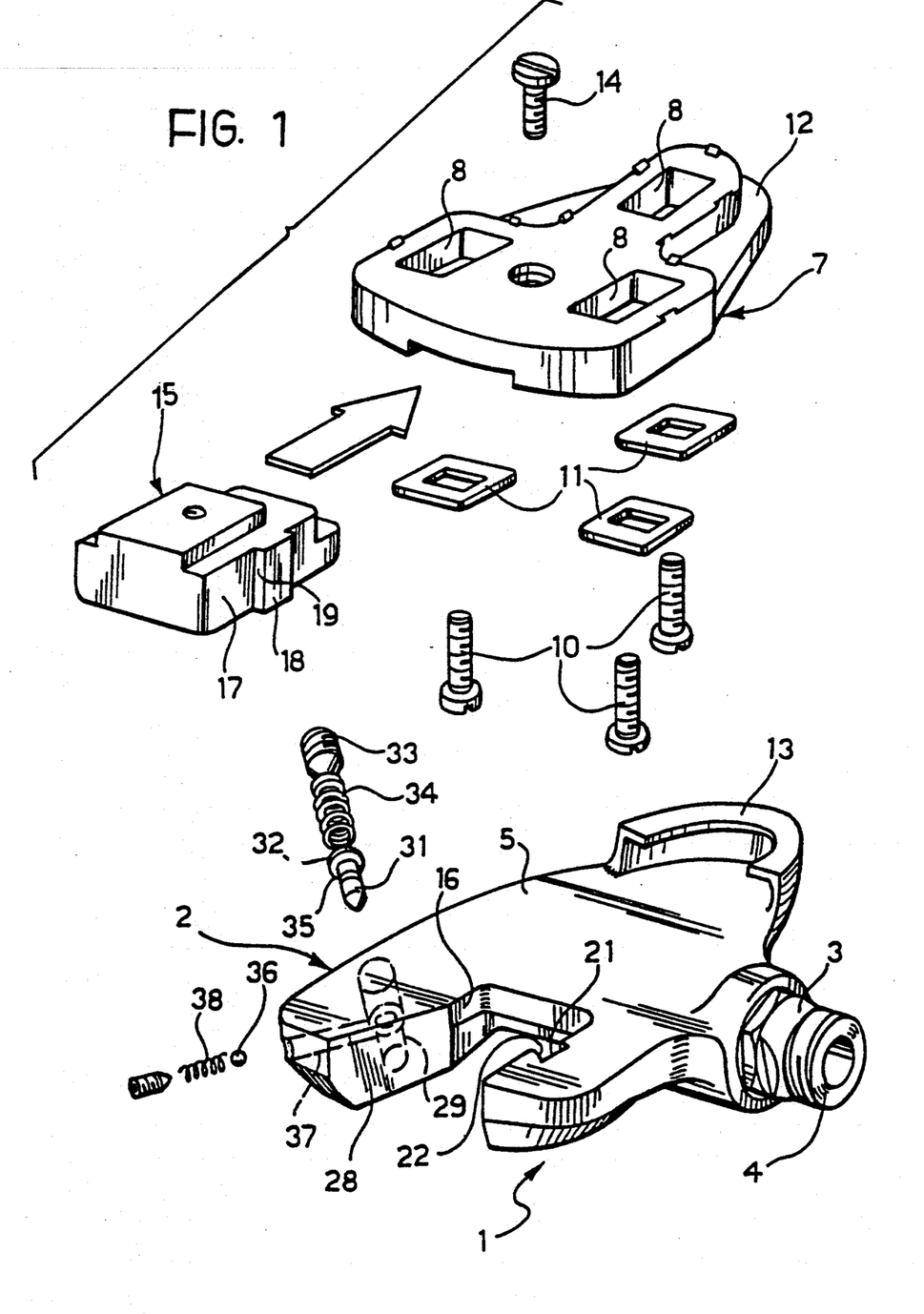
FIG. 1 is an exploded perspective view of a device according to a first embodiment of the invention.
Figures 2, 3:
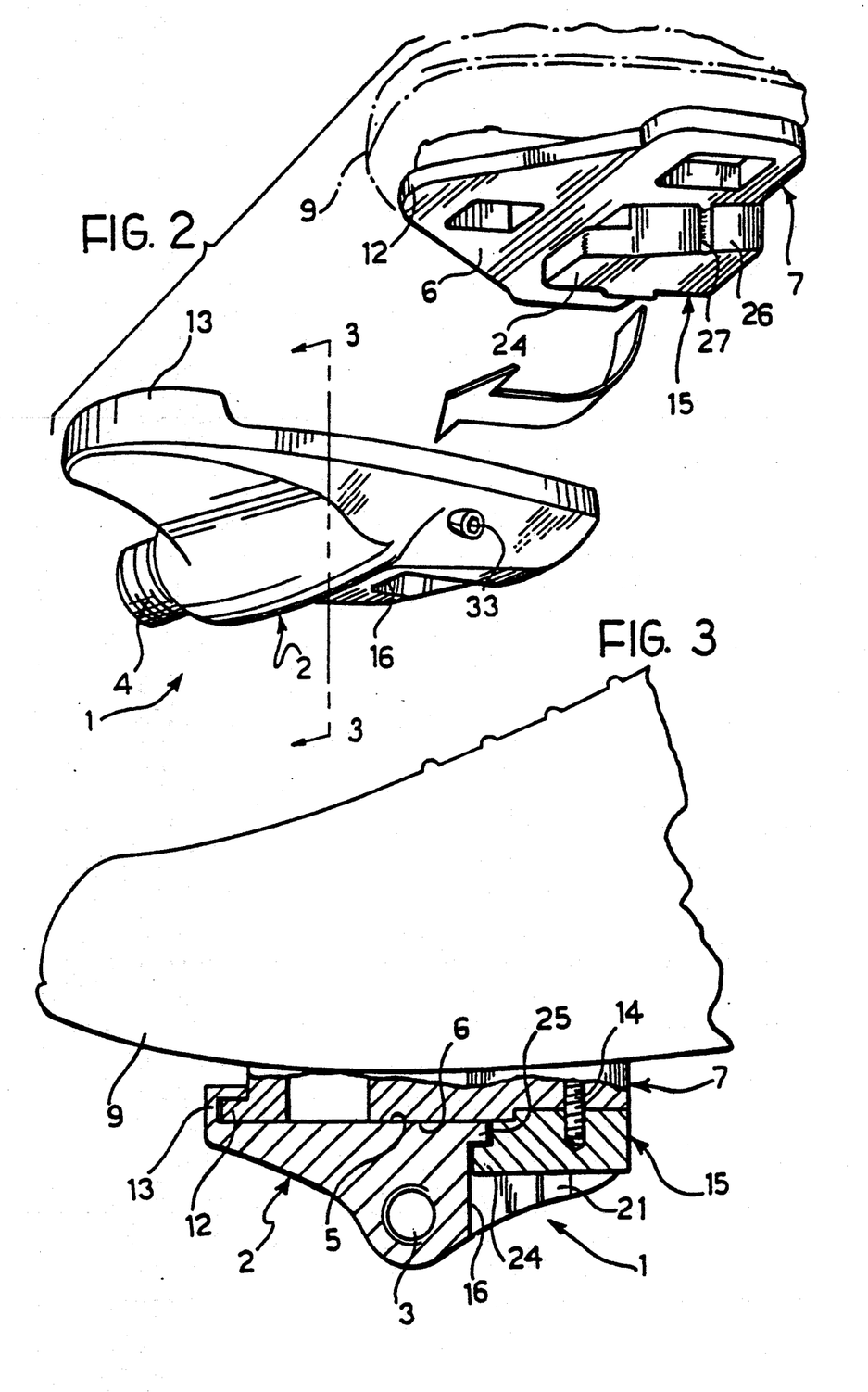
FIG. 2 is a perspective view of the device of FIG. 1 during the engagement stage.
FIG. 3 is a side view, partially in section, of the device shown in FIG. 1, the section being taken along the longitudinal centerline of the FIG. 1 device in assembled and locked position.

The block 15 has a step 24 in its front wall which cooperates with a corresponding step 25 formed in the facing wall of the seat 16 so as to define a stop which prevents the raising of the block 15 (see in particular FIG. 3).

Figure 4:
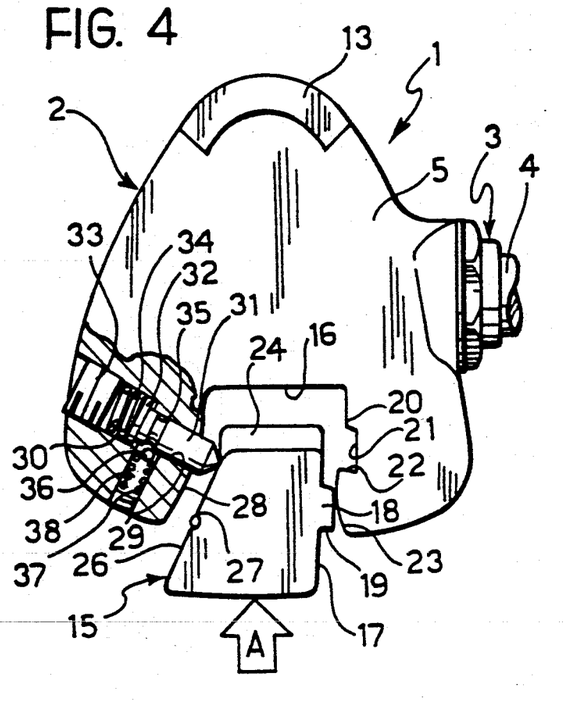
FIGS. 4 and 5 are partially-sectioned plan views of the device of FIG. 1 in two different configurations.
Figure 5:
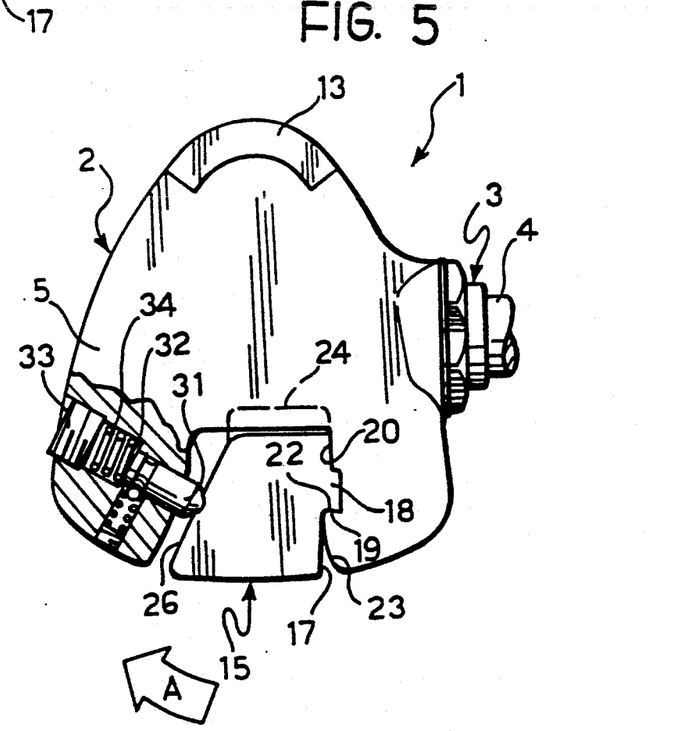

As seen in FIGS. 4 and 5, the block 15 is generally wedge-shaped in plan and a vertical groove is formed in its inclined side 26. The wall, indicated 28 in the drawings, of the seat 16 facing the inclined side 26 of the block 15 is formed with a bore 29 which communicates at its rear end with a larger-diameter bore 30. A pin 31 is slidable in the bore 29 and has an enlarged head 32 situated in the bore 30. The bore 30 is closed at one end by a grub screw 33 and houses a helical spring 34 between the grub screw 33 and the head 32. The spring 34 urges the pin 31 towards its most outwardly projecting position defined by the abutment of its head 32 against the end of the bore 30.

The pin 31 has a circumferential groove 35 in its shank which, when the pin is in the position shown in FIG. 5 corresponding to the engagement of the block 15 in the seat 16, is acted on by a ball 36 situated in a hole 37 and urged towards the groove 35 by a spring 38. The ball 36 allows the pin 31 to move back into the bore 29 against the action of the spring 34 only when subjected to a force greater than a predetermined value.

The operation of the engagement device described is as follows.

The shoe 9 is engaged with the pedal 1 by the placing of the counter-member 7 on the upper surface 5 of the pedal body 2 with the front portion 12 of the counter-member 7 behind the toe piece 13. The counter-member 7 is then moved forwards, simultaneously bringing the front portion 12 into the toe piece 13 and the fixing block 15 into the seat 16. During this forward movement, the inclined surface 26 of the block 15 exerts a force on the pin 31 which overcomes the force exerted by the ball 36 and makes the pin 31 move back against the action of the spring 34. When the tooth 18 of the block 15 is in correspondence with the recess 21, the block 15 moves transversely under the action of the pin 31 and the tooth 18 thus engages the recess 21. In this condition, shown in FIG. 5, the end of the pin 31 is inserted in the groove 27 in the block 15 and the ball 36 is located in the circumferential groove 35 of the pin 31.

In the configuration shown in FIG. 5, the counter-member 7 is locked to the pedal body 2 whatever movement occurs during pedalling (movement forwards, backwards, upwards and inwards).

The counter-member 7 can be released from the configuration shown in FIG. 5 by the transverse rotation of the heel of the shoe 9 in the sense indicated by the arrow A in FIG. 5. During this movement, the counter-member 7 rotates about its front portion 12, which is held by the toe piece 13, and the block 15 exerts a force on the pin 31 which tends to make it retract. When this force exceeds a predetermined value which is sufficient to release the pin 31 from the action of the ball 36, the pin 31 moves inwardly of the bore 29. The tooth 18 is thus released from the recess 21 and it is then possible to move the shoe 9 backwards, releasing the shoe completely from the pedal.

Figures 6, 7:
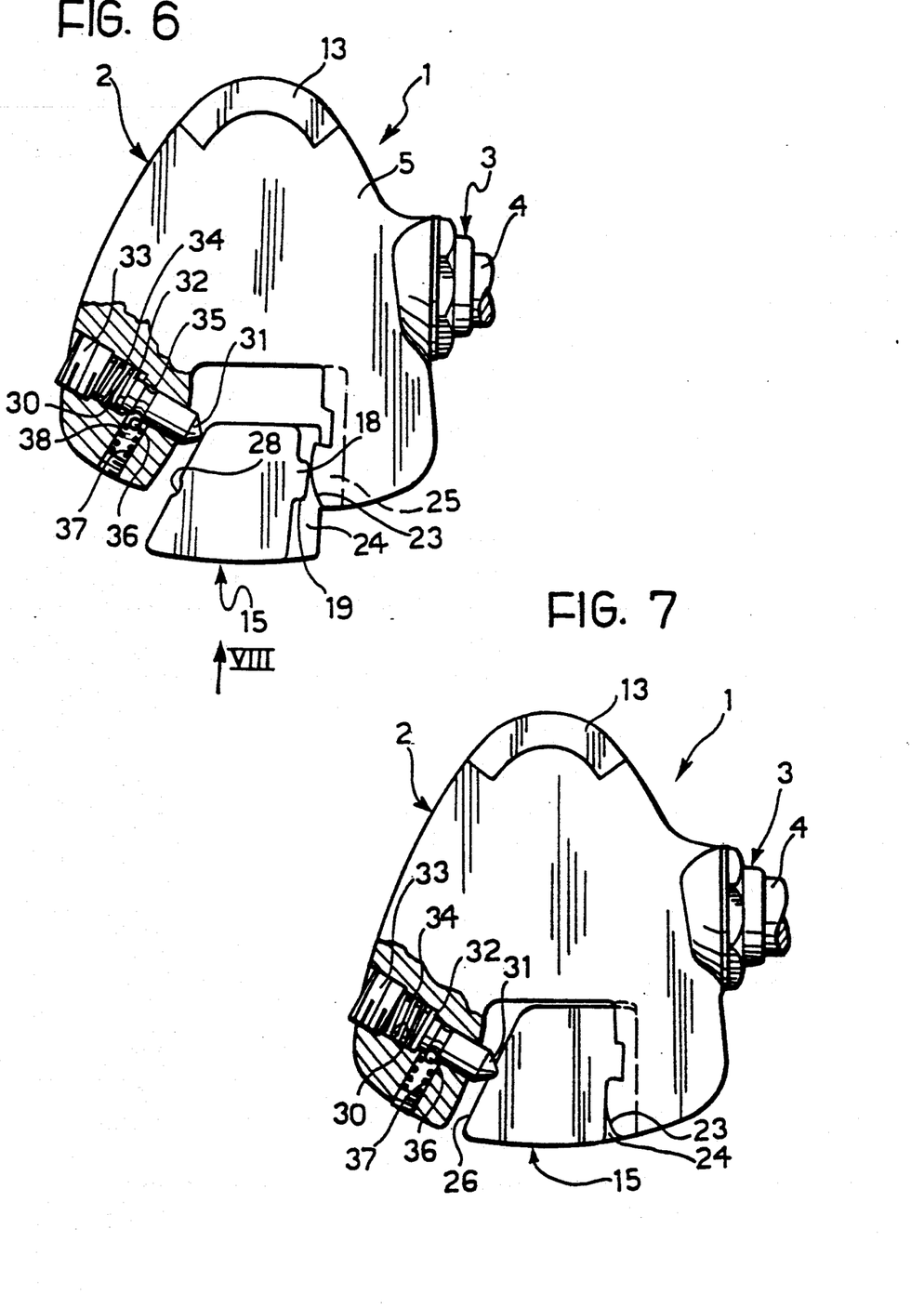
FIGS. 6 and 7 are views corresponding to FIGS. 4 and 5, relating to a second embodiment of the device according to the invention.
Figure 8:
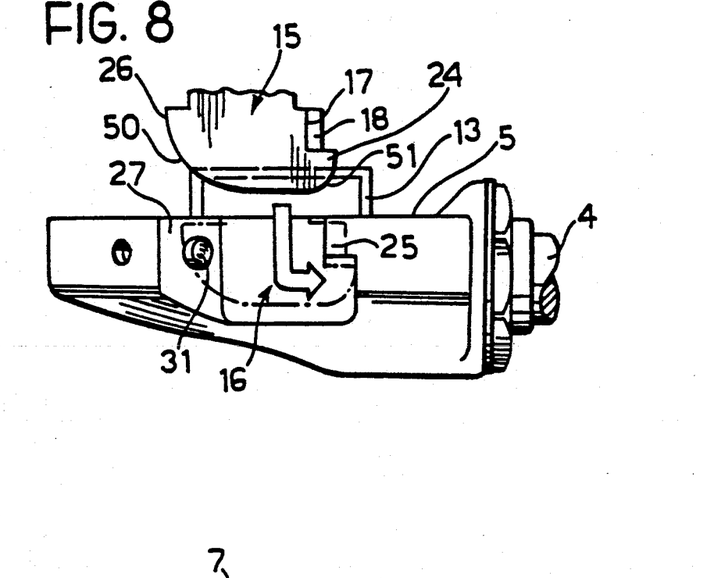
FIG. 8 is a view taken on the arrow VIII of FIG. 6 during the engagement stage.

FIGS. 6 to 8 show a second embodiment of an attachment device according to the present invention. The elements which correspond to those described above are indicated by the same reference numerals below.

The device shown in FIGS. 6 to 8 differs from that described above essentially in that the step 24 is situated on the side 17 of the block 15 instead of being in the front of the latter. As can be seen from FIG. 8, the side 26 of the block 15 and the lower part of the step 24 are connected to the lower wall of the block 15 by means of surfaces indicated 50 and 51 respectively.

By virtue of this shaping of the block 15, the latter can be engaged in the seat 16 by means of a downward movement of the block 15 from above, as well as by means of the forward movement described in connection with the first embodiment. In this case the shoe 9 is engaged with the pedal body 2 by the insertion of the front portion 12 of the counter-member in the toe piece 13 followed by the downward movement of the block 15 so as to insert it in the seat 16. During this movement, the connecting surface 50 urges the projecting end of the pin 31 backwards. When the block 15 is inserted in the seat 16 the action of the pin 31 brings the tooth 18 into engagement with the recess 21.

Figure 9:
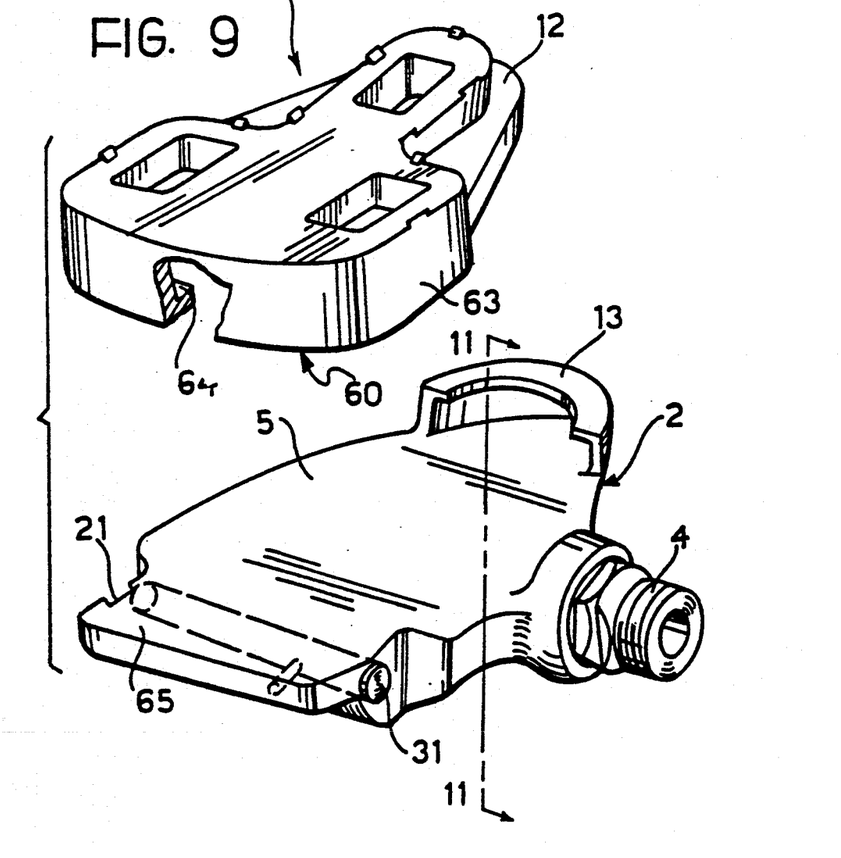
FIG. 9 is a perspective view of a third embodiment of the device according to the invention.
Figure 10:
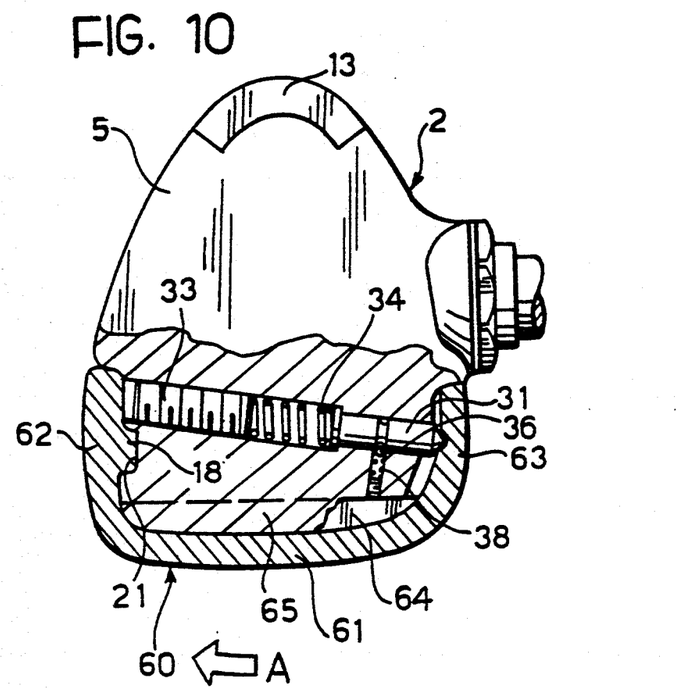
FIG. 10 is a partially-sectioned plan view of the device of FIG. 9.
Figure 11:
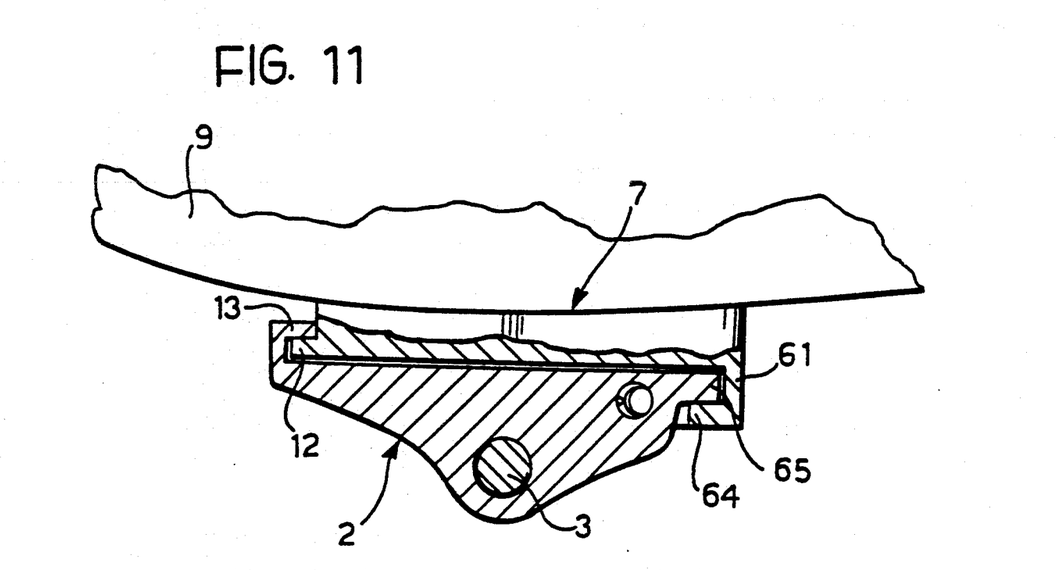
FIG. 11 is a side view, partially in section, of the device shown in FIG. 9, the section being taken along the longitudinal centerline of the FIG. 9 device in assembled and locked position.

With reference to FIGS. 9 to 11, a third embodiment of the device according to the invention will now be described.

In this case, the counter-member 7 has a peripheral wall 60 at its rear end which extends vertically towards the lower side of the counter-member 7. As shown in FIG. 10, the cross-section of the wall 60 is U-shaped and can be seen to include a central portion 61 and two side arms indicated 62 and 63. The central portion 61 of the wall 60 has a lower step 64 which cooperates with a rear portion 65 of the pedal body 2 so that, together with the front portion 12 inserted in the toe piece 13, it prevents the counter-member 7 from being released upwardly from the pedal body 2.

In this third embodiment of the device according to the invention, the tooth 18 is formed in the arm 62 of the peripheral wall 61. The tooth 18 is inserted in the recess 21 formed in the side portion of the pedal body 2 by means of a forward movement of the counter-member 7 relative to the pedal body 2. As in the previous embodiments, the pin 31 situated in the pedal body 2 is made to retract by the arm 63 of the wall 60.

In this case the counter-member 7 is also released from the pedal body 2 by a movement of the shoe in the sense indicated by the arrow A in FIG. 10.

In the above description only the left hand pedal has been described, since the right hand pedal is specularly identical thereto.

I claim:

1. A device for attaching a shoe to a bicycle pedal, comprising:
   a. a pedal body rotatably mountable on a bicycle pedal crank and provided with an upper bearing surface;
   b. a counter-member attachable to a sole of the shoe and having a lower bearing surface engageable with the upper bearing surface of the pedal body, and
   c. rapid attachment means for establishing firm mutual coupling of the pedal body and the counter-member by engagement of the upper bearing surface of the pedal body and the lower bearing surface of the counter-member, and wherein:

the pedal body includes a toe piece adapted to house and prevent upward disengagement of a front portion of the counter-member from the upper bearing surface of the pedal body when the pedal body and the counter-member are in the mutually coupled position;

the counter-member includes a first step adapted, in a coupled position of the pedal body and the counter-member, for engagement beneath a corresponding second step formed in the pedal body rearwardly of the toe piece and preventing upward disengagement of the counter-member from the pedal body, and the rapid-attachment means comprising:

mutual coupling surfaces formed, respectively, in the counter-member and in the pedal body and extending substantially in planes perpendicular to the planes of the lower bearing surface of the counter-member and of the upper bearing surface of the pedal body, and comprising a tooth and a recess engageable with each other, in coupled position of the counter-member and the pedal body, by relative movement of the counter-member and the pedal body in a direction transversely of the length thereof;

a cam member formed on the counter-member and having an elongated cam surface lying in a plane perpendicular to the plane of the lower bearing surface of the counter-member and disposed at an angle to the longitudinal centerline of the counter-member, the cam surface being provided with an elongated groove extending substantially between upper and lower edges of the cam surface in a position intermediate forwardly and rearwardly disposed edges of the cam surface;

a retractable and extendable spring-biased thrust member carried by the pedal body and adapted to cooperate with the cam surface on the counter-member by:

first, a cam surface-induced retraction of the thrust member against the biasing spring upon engagement of the lower bearing surface of the counter-member with the upper bearing surface of the pedal body and under the action of downward and longitudinally forwardly directed movements of the counter-member relative tot he pedal body;

second, when the forward movement of the counter-member relative to the pedal body brings into registration respectively (1) the front portion of the counter-member and the toe piece on the pedal body, (2) the first and second steps, and (3) the tooth and recess, an extension of the thrust member into the elongated groove on the cam surface and simultaneously an exertion by the thrust member on the cam member of a spring-induced coupling force having a component of predetermined magnitude in a direction transverse of the length of the counter-member, such force causing snap engagement of the tooth and recess and preventing disengagement of the tooth and recess under an applied force having a component in a direction transverse of the length of the counter-member of magnitude less than the aforesaid predetermined magnitude, and third, upon application to the counter-member and the associated cam member of a force having a component in a direction transverse to the length of the counter-member greater than the aforesaid predetermined magnitude, retraction of the thrust member out of the elongated groove thereby permitting decoupling of the counter-member and the pedal body by (1) transverse disengagement of the tooth and recess and thereafter by (2) longitudinal disengagement of (i) the front portion of the counter-member and the toe piece of the pedal body and (ii) the first and second steps by movement of the counter-member longitudinally rearward relative to the direction of advance of the bicycle.

2. A device according to claim 1 wherein the tooth is formed on one side of an anchoring block a portion of which projects below and is spaced from the lower bearing surface of the counter-member, the anchoring block being housed, in the coupled position of the counter-member and the pedal body, in a seat formed by a recess in the pedal body.

3. A device according to claim 2, wherein the recess and the tooth extend substantially perpendicular to the upper bearing surface of the pedal body and to the plane of the lower bearing surface of the counter-member, the tooth having a stop surface which is inclined towards the rear of the counter-member with reference to the direction of advance of the bicycle.

4. A device according to claim 2, wherein the seat in the pedal body is constituted essentially by a cut-out portion which is open towards the rear of the pedal body.

5. A device according to claim 4, wherein the side of the seat which corresponds to the side of the block carrying the tooth has a connecting flared entry part.

6. A device according to claim 3, wherein the anchoring block is generally wedge-shaped in a plane parallel to the plane of the lower bearing surface of the counter-member, the side of the anchoring block opposite that which carries the tooth constituting the cam surface for cooperation with the thrust member.

7. A device according to claim 2, wherein the first step is formed in a front wall of the anchoring block and, relative to the longitudinal centerline of the counter-member, constitutes the forwardmost portion of the anchoring block and is spaced below the plane of a lower surface of the second step and juxtaposable thereto in a coupled position of the counter-member and the pedal block.

8. A device according to claim 2, wherein the first step in the counter-member is formed in the side of the anchoring block which carries the tooth.

9. A device according to claim 6, wherein the thrust member comprises a pin slidable in a first bore formed in the pedal body, one end of the pin being urged out of the first bore by a first spring and cooperating with the cam surface on the anchoring block.

10. A device according to claim 9, wherein the cam surface causes retraction of the pin into the first bore when the anchoring block is inserted into the recessed seat in the pedal body by means of downward and forward movements relative to the pedal body.

11. A device according to claim 1, wherein the counter-member has a vertical peripheral wall whose section, in a horizontal plane, is U-shaped and which extends, in the coupled condition, beneath the upper bearing surface of the pedal body, the central portion of the wall carrying the step for coupling with a rear portion of the pedal body.

12. A device according to claim 11, wherein one of the side arms of the U-shaped section carries the tooth which, in the coupled condition, engages the respective recess formed in the said of the pedal body.

13. A device according to claim 12, wherein the thrust member comprises a pin slidable in a bore formed in the pedal body, one end of the pin being urged out of the bore by a helical spring so as to cooperate with the side arm of the U-shaped section opposite that which carries the tooth.

14. A device according to claim 9 or claim 13, wherein the pin has a circumferential groove which, when the pin is in the position corresponding to the mutual coupling of the pedal body and the counter-member, is acted on by a retaining member slidable in a second bore formed in the pedal body and urged towards the groove by a helical spring.

15. A device according to claim 9, wherein the pin is provided with circumferential groove and the pedal body is provided with means adapted to enter the circumferential groove and to hold one end of the pin in the elongated groove in the cam surface in a coupled position of the counter-member and the pedal body with a force of the aforesaid predetermined magnitude until application to the counter-member of a transversely directed force of a magnitude greater than aid predetermined magnitude.

16. A device according to claim 15, wherein one end of the first bore remote from the one end of the pin is closed with a first threaded screw, the pin is provided with an annular collar located intermediate the two ends of the pin and outwardly of the circumferential groove in the pin, the first spring is an elongated helical compression spring having one end thereof bearing on the first threaded screw and the other end bearing on the collar, the pedal body is provided with a second bore normal to the longitudinal axis of the pin and communicating at an outer end thereof with a surface of the pedal body and at an inner end with the first bore inwardly of the collar, the outer end of the second bore being closed with a second threaded screw, a second helical compression spring in the second bore and having one end thereof bearing against the second threaded screw and the other end thereof bearing against and urging a ball against the pin, whereby, in a coupled position of the counter-member and the pedal body, the ball is positioned in the circumferential groove thereby holding in the elongated groove in the cam surface the end of the pin cooperating with the cam member.

* * * * *